United States Patent [19]
Lannerd et al.

[11] Patent Number: 4,860,972
[45] Date of Patent: Aug. 29, 1989

[54] AUXILIARY FUEL TANKS FOR AIRCRAFT
[75] Inventors: Robert F. Lannerd; David K. Murphy, both of Lake Charles, La.
[73] Assignee: ERA Aviation, Inc., Lake Charles, La.
[21] Appl. No.: 154,001
[22] Filed: Feb. 9, 1988
[51] Int. Cl.$^4$ ............................................. B64D 37/04
[52] U.S. Cl. ............................... 244/135 R; 244/137.1
[58] Field of Search ........... 244/135 R, 135 A, 135 B, 244/137.1, 149

[56] References Cited
U.S. PATENT DOCUMENTS

| | | | |
|---|---|---|---|
| 2,591,913 | 4/1952 | Bowers et al. | 244/135 R |
| 2,852,299 | 9/1958 | Johnson | 244/135 R |
| 2,952,427 | 9/1960 | Armstrong | 244/135 R |
| 3,383,078 | 5/1968 | Shohet et al. | 244/135 R |
| 3,421,717 | 1/1969 | Di Piro | 244/135 A |
| 3,778,011 | 12/1973 | Cannon | 244/137.1 |
| 3,966,147 | 6/1976 | Wittko et al. | 244/135 B |
| 4,172,573 | 10/1979 | Moore et al. | 244/135 R |

Primary Examiner—Sherman D. Basinger
Assistant Examiner—Stephen P. Avila
Attorney, Agent, or Firm—John K. Donaghy

[57] ABSTRACT

On a helicopter having a main fuel tank and outer curved walls with connector lugs thereon, an auxiliary fuel tank for each side of the helicopter, each tank being of aerodynamically streamlined configuration having an outer convex wall, a top rounded wall, a bottom rounded wall and an inner concave wall for abutment against said outer curved wall of said helicopter; a plurality of connector ears on said tanks for attachment to said lugs; said connector ears having a breakage point of 5000 PSI; said connector lugs having a breakage point of less than 5000 PSI, whereby said auxiliary fuel tanks may break away from said helicopter in the event of a crash landing; gravity feed lines from the helicopter's main fuel tank to said auxiliary tanks whereby said tanks are filled from said main fuel tank when said main fuel tank reaches a predetermined high level, and auxiliary pumps in said auxiliary fuel tanks for pumping the fuel from said tanks to said main fuel tank when said main fuel tank reaches a predetermined low level.

9 Claims, 10 Drawing Sheets

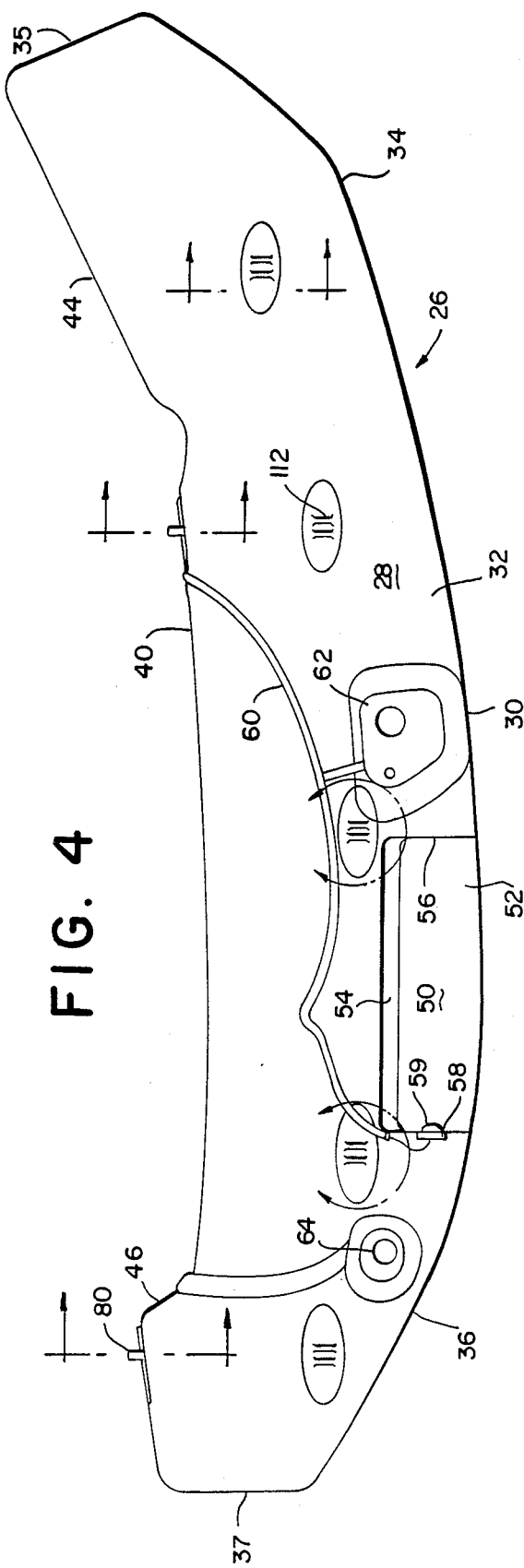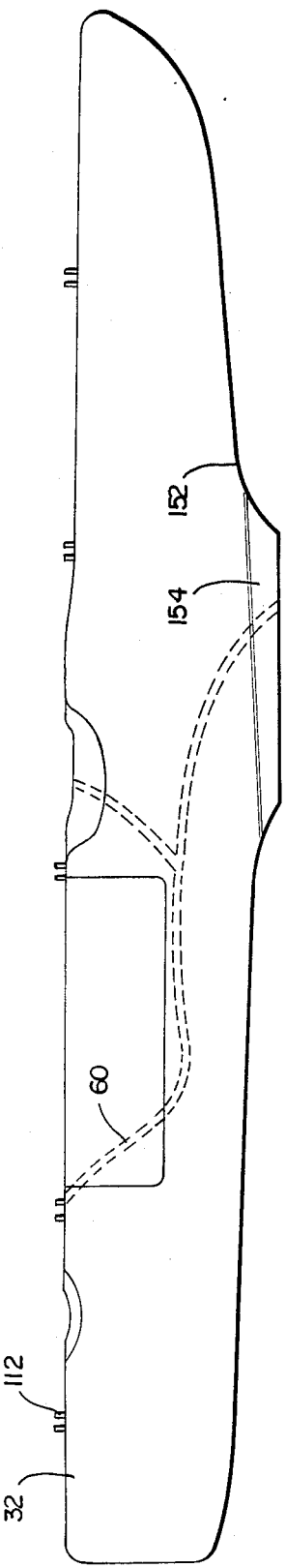

AUXILIARY FUEL TANKS FOR AIRCRAFT

BACKGROUND OF THE INVENTION

1. Field of the Invention

This invention pertains to auxiliary fuel tanks for aircraft and especially helicopters, which are attached to the aircraft by breakaway fittings to permit the tanks to break away from the helicopter in the event of a crash landing.

2. Background of the Prior Art

The prior art shows auxiliary fuel tanks for use on helicopters wherein the tanks are attached to the body of a helicopter by various means. Representative of the prior art are the following patents:

| | | |
|---|---|---|
| DiPiro | 3,421,717 | Inflight Pressure Refueling Probe |
| Cannon | 3,778,011 | Helicopter Cargo Pod |
| Wittko | 3,966,147 | Hammock Supported Fuel Tank |

DiPiro shows a helicopter 10 having auxiliary fuel tanks 70 and 72 connected to a helicopter by connectors 620, 630 and 636 (one set described).

Cannon discloses cargo pods 1 and 3 for attachment to an aircraft by a complex arrangement of couplings and connectors shown in FIGS. 5-7.

Wittko is directed to a self-sealing fuel tank for a helicopter which is suspended from beneath the helicopter in a hammock 18 by a support bar 20 and hinge assembly 21.

SUMMARY OF THE INVENTION

One object of this invention is to provide auxiliary fuel tanks for helicopters which are easily attached to existing hard points on the helicopter.

It is another object of this invention to provide auxiliary fuel tanks which are uniquely shaped to reduce or eliminate drag on the helicopter during flight and aerodynamically increase stability of the aircraft.

Still another object of this invention is to provide fuel fill means for the tanks from the main fuel tank after a predetermined fuel load in the main fuel tank is reached.

Yet another object of this invention is to provide separate pumping systems for pumping the fuel from the auxiliary fuel tanks to the main tank.

And another object of this invention is to interconnect the auxiliary tanks mechanically with tubing having frangible crashworthy fittings. This unique interconnect provides for symetric lateral balancing of fuel in the auxiliary tanks in the event of failure of an auxiliary pump in one of the auxiliary tanks.

These and other objects of the invention will become apparent to those skilled in the art to which the invention pertains from a reading of the following specifications when taken in light of the annexed drawings.

BRIEF DESCRIPTION OF THE DRAWINGS

FIG. 4 is a plan view of the left side auxiliary fuel tank showing details of the connectors for connecting the tanks to the aircraft.

FIG. 5 is a side view of the tank of FIG. 4.

DETAILED DESCRIPTION OF THE PREFERRED EMBODIMENT OF THE INVENTION

Figure 1:
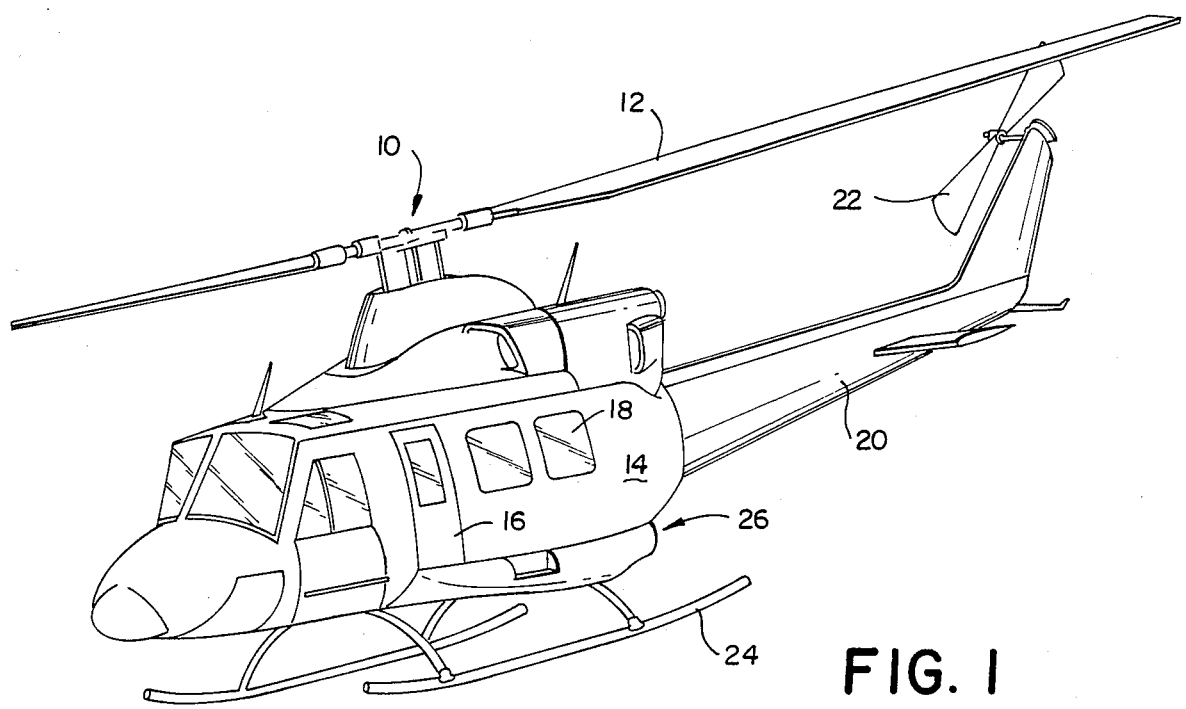
FIG. 1 is a perspective view of a helicopter showing the left side auxiliary fuel tank installed below the entrance door.

Referring now to the drawings in more detail, FIG. 1 shows a conventional helicopter 10 having rotors 12, main body 14 with access door 16, side windows 18, tail section 20 with tail rotor 22 and landing gear 24. An auxiliary fuel tank 26 is shown attached to the body of the helicopter below the access door 16 and windows 18. It will be understood at this point that an identical auxiliary fuel tank is also attached to the opposite side of the aircraft. As each auxiliary fuel tank is identical, and as the attach connections on the tanks and on the aircraft are identical, only the left side tank and attach connections will be discussed.

Figure 2:
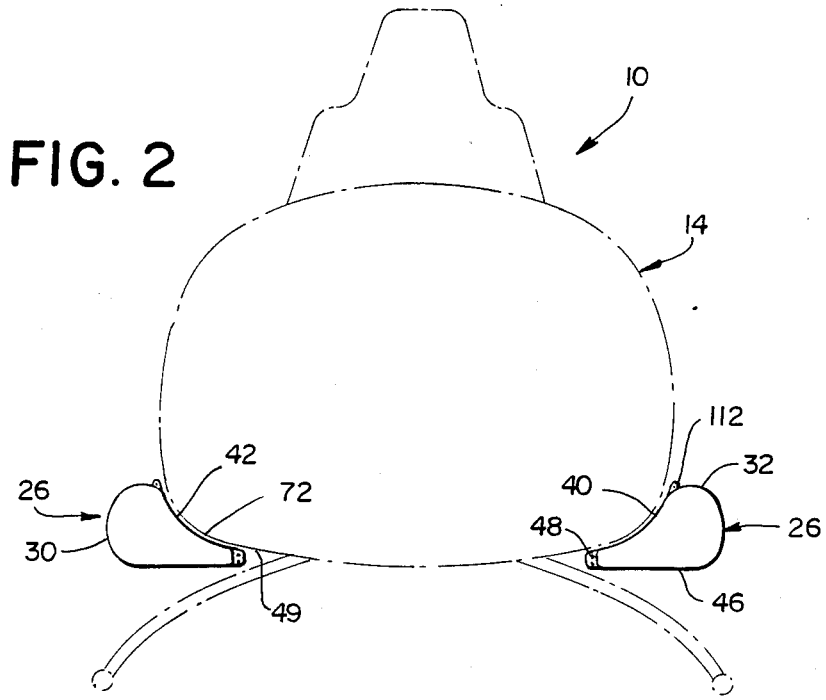
FIG. 2 is an end view in section of the helicopter showing the auxiliary fuel tanks installed on the aircraft.

FIG. 2 shows an end view in section of the helicopter 10 with auxiliary fuel tanks 26 attached to the aircraft.

FIG. 4 shows a plan view of the left side auxiliary fuel tank 26 comprising a main body section 28 having a generally convex outer wall 30, a top wall 32, an aft wing section 34 and forward wing section 36. The tank 26 has a generally concave inner wall 40 as do walls 44 and 46 of wing sections 34, 36 which abut the curved wall 42 of the aircraft. The end wings 34, 36 taper inwardly toward tips 35, 37 to come smoothly into the curved wall of the aircraft, thereby providing aerodynamic stability for the aircraft. Each tank 26 has a flat bottom wall 46, FIG. 2, extending to a point 49 beneath the aircraft and terminating at an inner edge 48 substantially narrower than the depth of the tank between the top wall 32 and bottom wall 46. The outer wall 30 has a depression 50, FIG. 4, comprising a flat horizontal wall 52, an inner vertical wall 54 which terminates at top edge wall 32 and vertical side walls 56, 58. The depression 50 functions as a step for passengers entering or exiting the aircraft and as a platform for workers. A lamp 59 on one or more of the walls lights the step 50.

Figure 6:
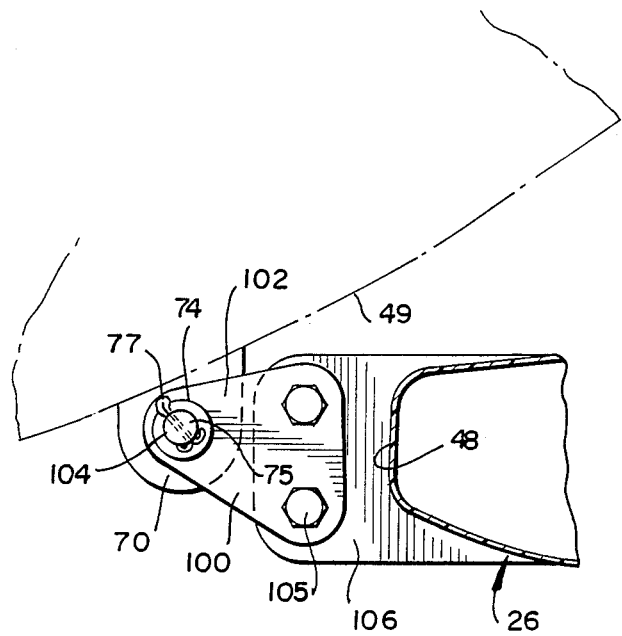
FIG. 6 is a side view looking aft at the forward lower attach connect fitting.
Figure 7:
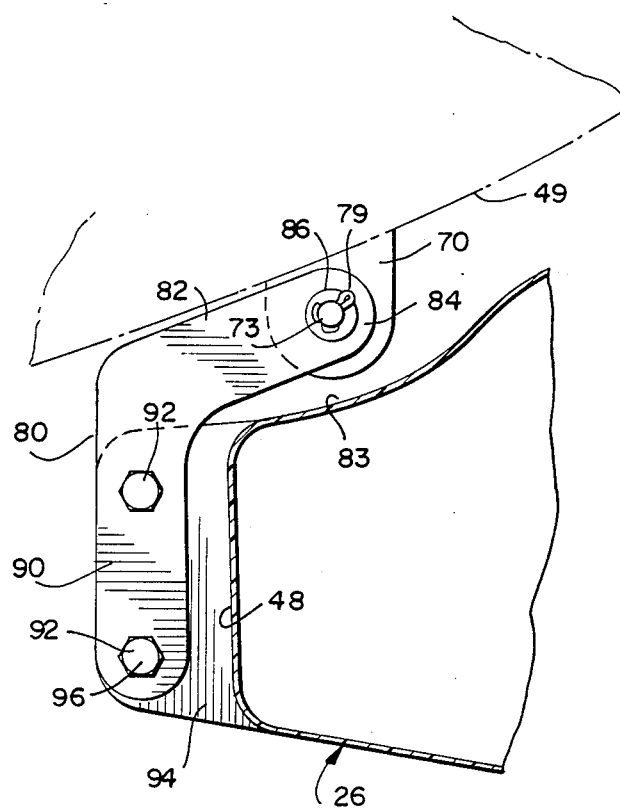
FIG. 7 is a side view looking aft at the lower attach connect fitting.
Figure 8:
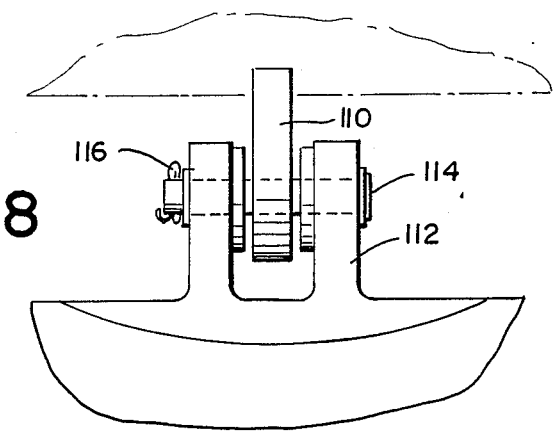
FIG. 8 is a side view of the upper forward attach connect fitting.
Figure 9:
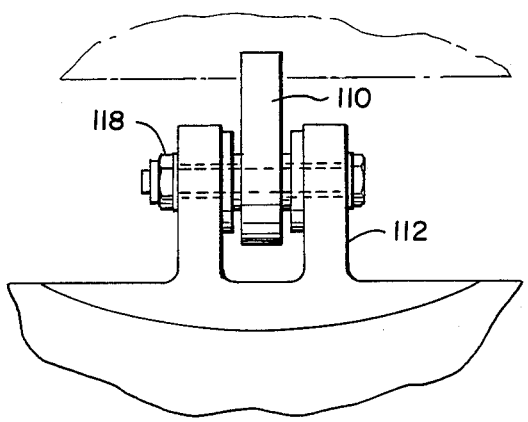
FIG. 9 is a side view of the upper center attach connect fitting.
Figure 10:
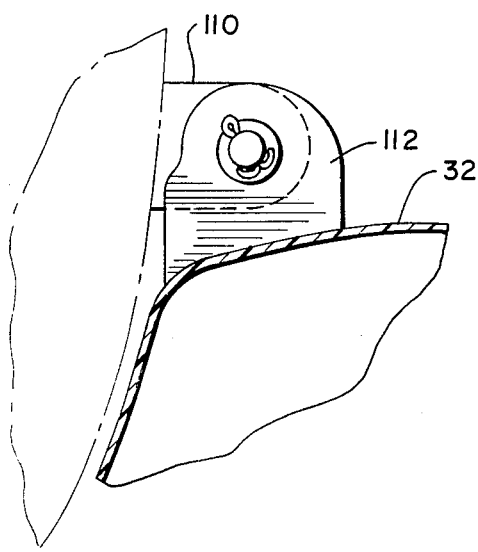
FIG. 10 is a side view looking aft at the upper end attach fitting.

The aircraft 10 has a plurality of lower connector lugs 70, FIGS. 6 and 7, extending from the curved wall 42 near point 49, FIG. 2, under the belly of the aircraft. These lugs are referred to in the industry as hard points and are standard hardware on helicopters of this kind. Each of the lugs 70 has a lateral bore 74 for receiving a pin or bolt, to be more fully described below.

Each auxiliary fuel tank 26, in the aft section near wing 34 at its lower edge 48, FIGS. 2 and 7, has an attach fitting 80 comprising an L-shaped arm having an inward leg 82 extending a distance over the curved section 83 of the tank. The leg 82 has parallel spaced ears 84 (one shown) and aligned lateral bores 86. Each fitting 80 has a vertically downwardly extending leg 90 with vertically spaced-apart lateral bores 92. The legs 90 are attached to a plate 94 attached to the edge side 48 of the tank 26. The plate 94 has appertures corresponding to the bores 92 and bolts 96 with nuts securing the leg 90 to the plates 94. The leg 82 is attached to the lug 70 by a rod 73 having a cotter pin 79.

The tank 26, at the forward lower end in wing 46, has a generally triangular plate 100 with spaced-apart parallel ears 102 (one shown) and lateral bores 104. The plate 100 is attached by bolts 105 and nuts to a bracket 106 mounted on the lower edge 48 of the tank 26 and to the lug 70 by a rod 75 having a cotter pin 77. It will be seen that these connecting parts permit pivotal movement of the tanks in upward and downward directions on the rods 73 and 75.

The aircraft also has a plurality of horizontally spaced upper attach connector lugs 110 similar to the lower lugs 70, FIGS. 8-10 and 16. Each fuel tank 26 has a plurality of upper attach ears 112 located on the inner concave wall 40 near the upper edge wall 32, FIGS. 2 and 16. The ears 112 have lateral bores and are attached to the lugs 110 by rods 114 and cotter pins 116 or nuts 118.

Each lug or hard point 70, has a downward break factor of less than 5000 PSI, and above 500 PSI, whereas each set of ears has a break factor of 5000 PSI. This is an important safety feature since, should the helicopter crash, the lugs should break allowing the tanks 26 to fall away from the aircraft, thus eliminating the possibility of an explosion on or near the helicopter.

Figure 3:
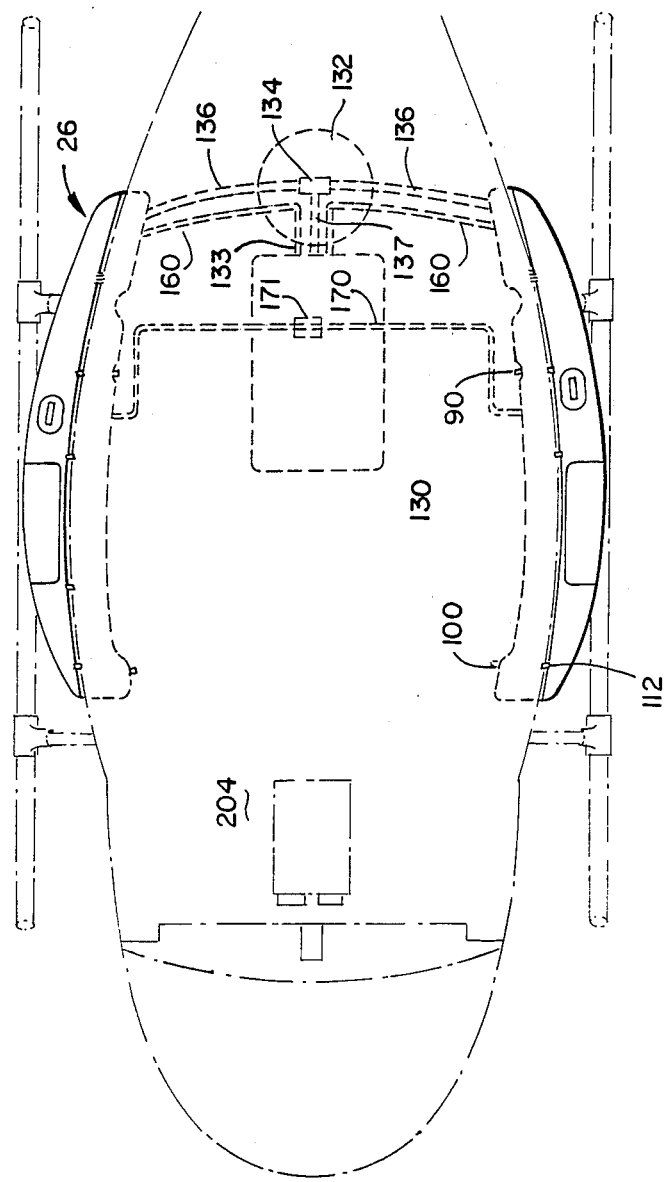
FIG. 3 is a plan view of a helicopter and shows the auxiliary fuel tanks, fill lines from the main fuel tanks to the auxiliary fuel tanks and cross feed tubing between the tanks.
Figure 11:
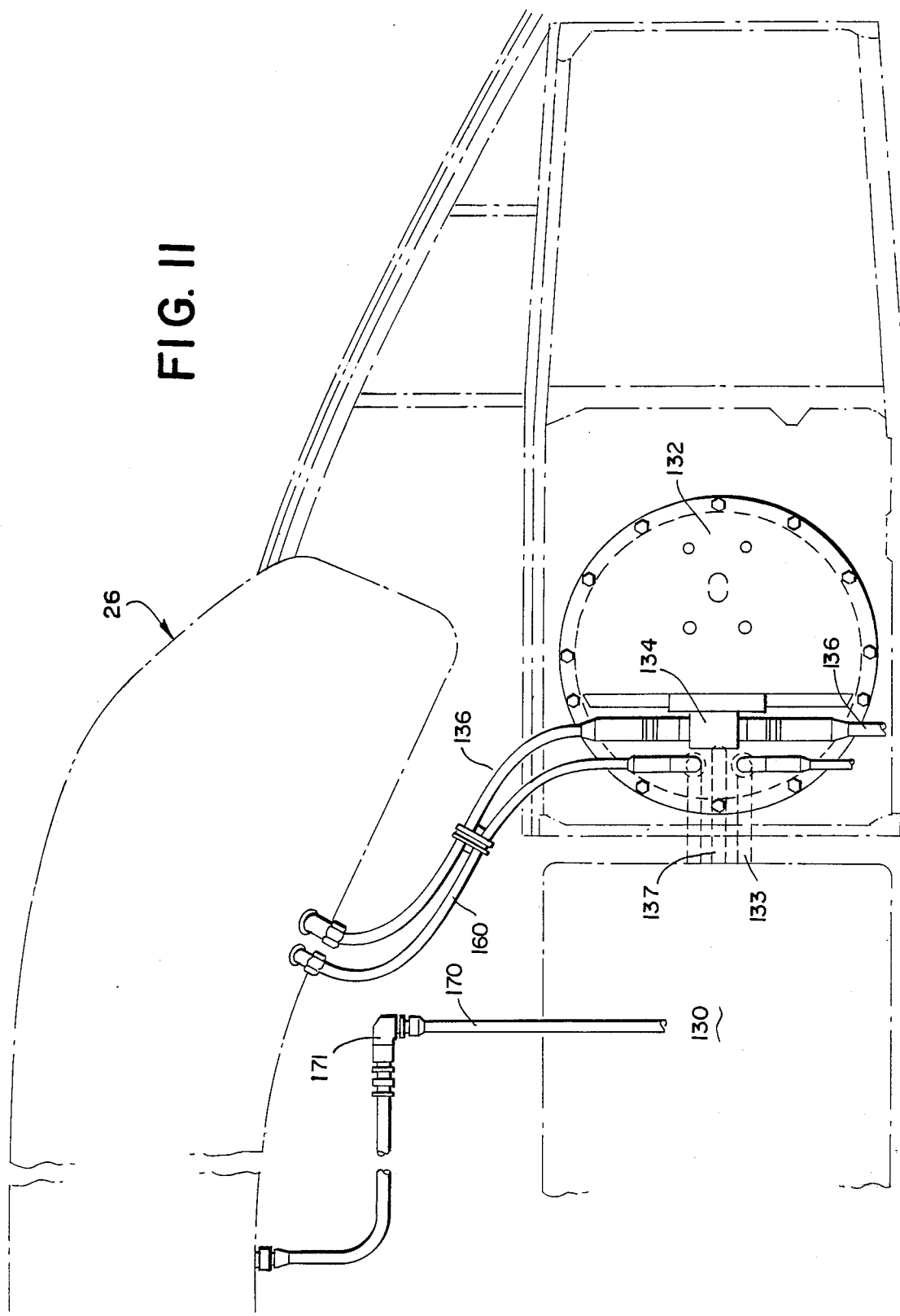
FIG. 11 is a bottom view looking up from beneath the helicopter and showing the auxiliary tank fill lines from the main fuel tank.
Figure 12:
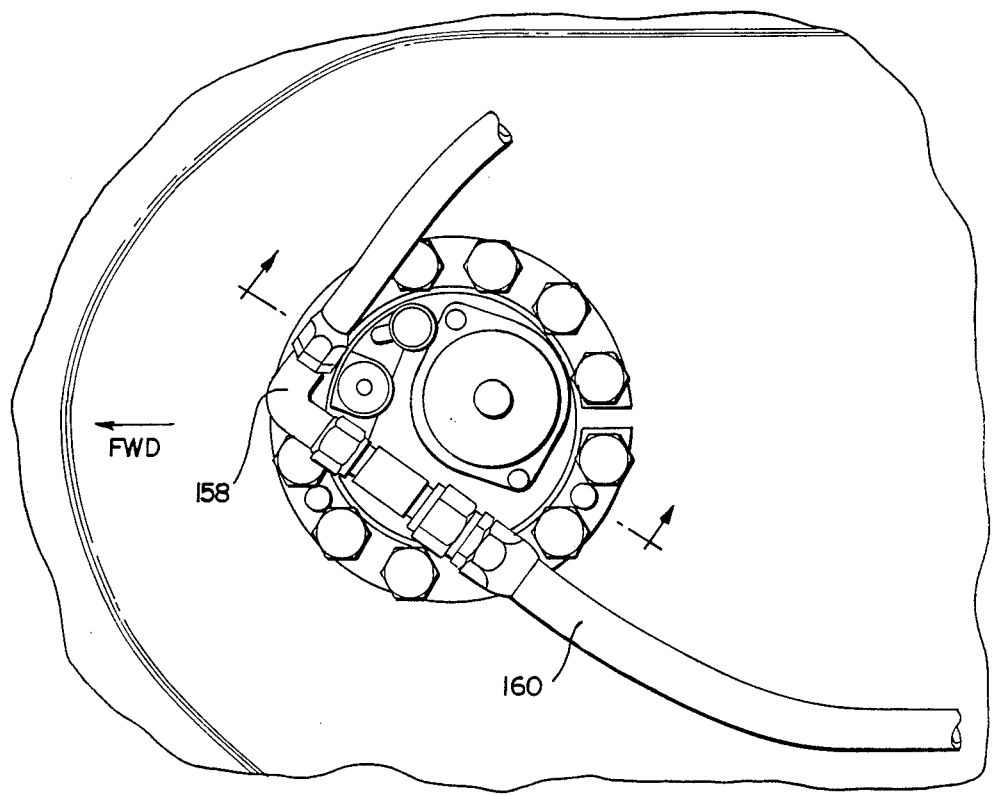
FIG. 12 is a view looking down into the tank at the auxiliary fuel pump.
Figure 13:
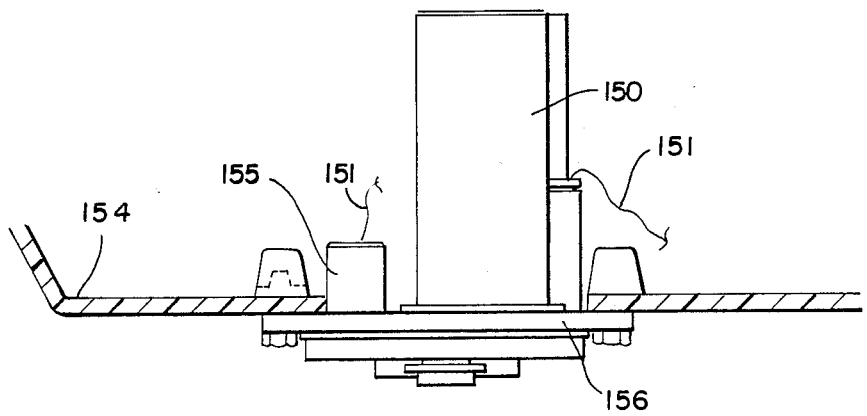
FIG. 13 is a cross sectional view of the auxiliary tank showing the auxiliary fuel pump in place.
Figure 14:
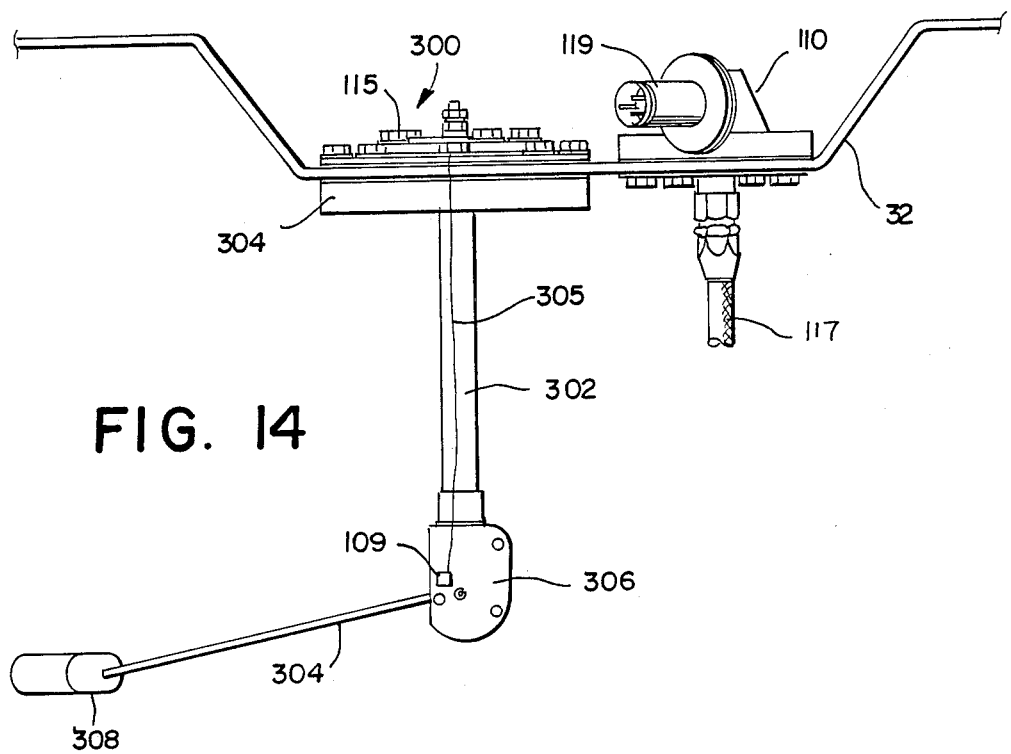
FIG. 14 is a vertical cut-away view of an auxiliary fuel tank showing a float type fuel quantity transmitter and pressure switch.

FIG. 3 shows a plan view of a helicopter 10 with auxiliary fuel tanks 26 attached to the body by lower connectors 90, 100 and upper connectors 110. the helicopter 10 has at least one main fuel tank 130 which is filled in a customary fashion from external fuel sources. The main tank 130 has an access plate 132, FIGS. 3 and 11, with coupling 134 to which there is attached one end of a tube 136. The opposite end of tube 136 is connected to the tank 26. The coupling 134 has a line 137 leading to the main fuel tank 130. When the main tank 130 is filled to a predetermined level, say 190 gallons, the auxiliary tanks 26 will begin to fill through the fill tubes 136 until each is full. Each tank 26 is provided with a pump 150, FIGS. 12, 13, which is positioned inside the tank on the bottom wall 152 within a well 154, FIG. 5. The pump 150 is attached to the tank by an attachment plate 156 having a coupling 158 which connects the pump to supply line 160 at one end, FIG. 3. The opposite end of line 160 is attached to the main fuel tank at access plate 132 and internal lines 133. It will be understood that each auxiliary pump is operated separately and functions to transfer the fuel from the auxiliary tanks to the main tank.

The auxiliary fuel tanks 26 are connected to each other by gravity cross feed line 170 having frangible fittings 171 which permit quick disconnect in the event of a crash. The interconnect line permits lateral balancing of the tanks in the event one of the auxiliary pumps fails. That is, the fuel is transferred to the opposite auxiliary tank by gravity cross-flow and then transferred to the main tank by the operable auxiliary pump.

Figure 17:
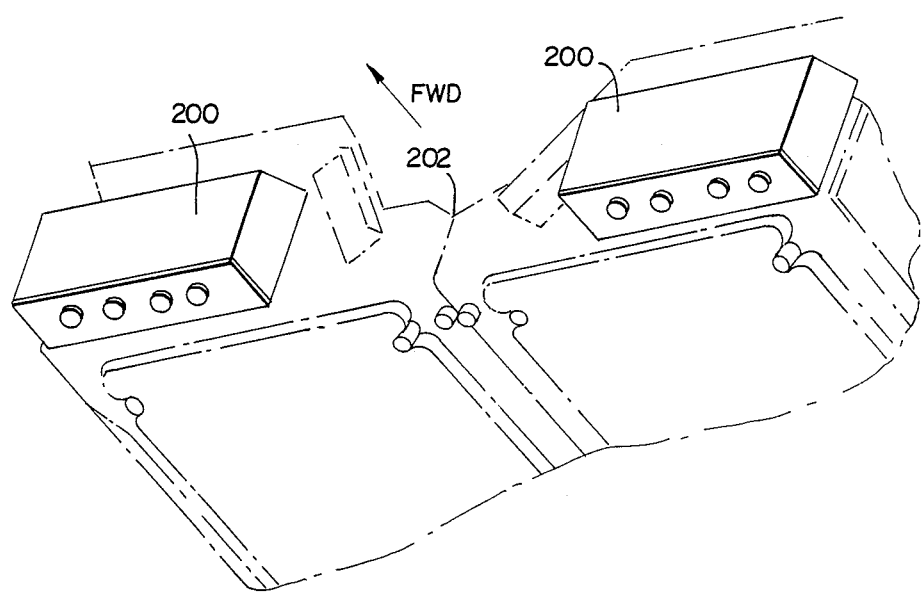
FIG. 17 is a view looking up at the overhead circuit breaker panels in the cockpit.
Figure 18:
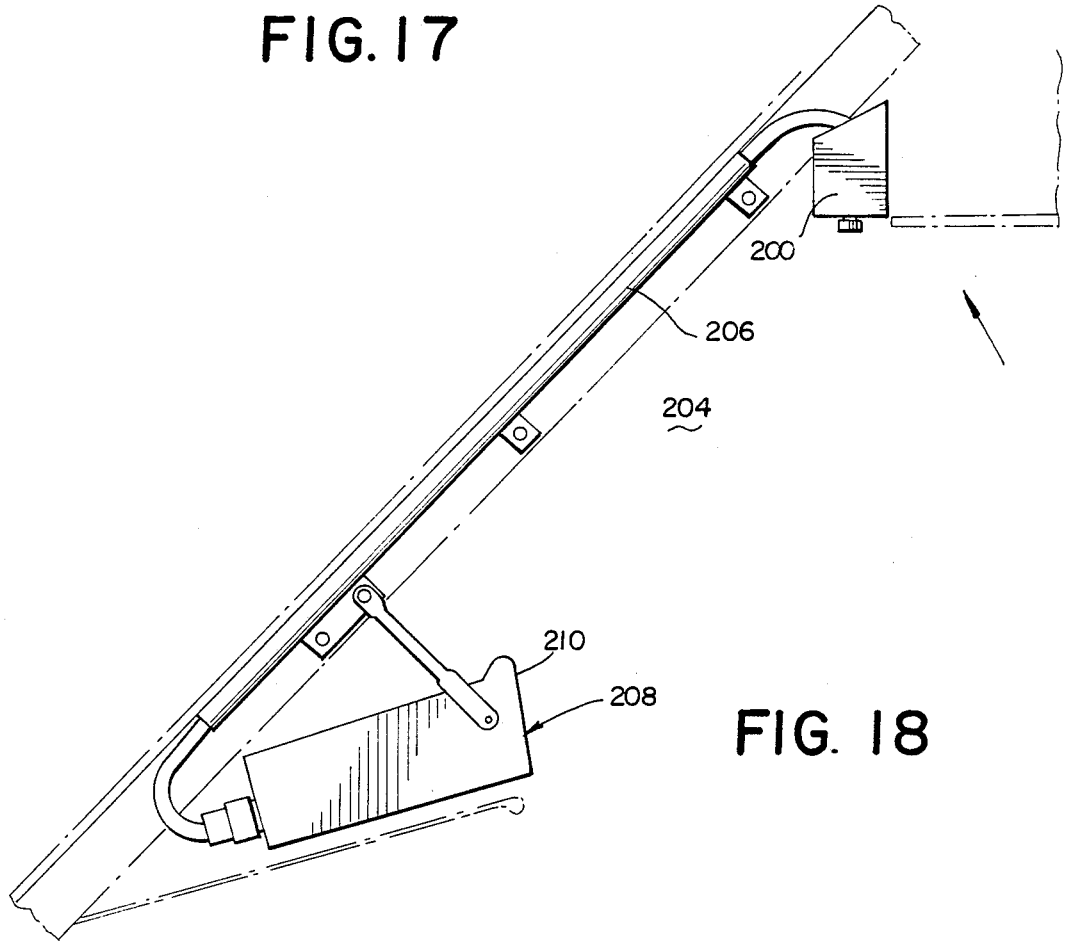
FIG. 18 is a side view showing the control panels.

The auxiliary fuel pumps may be operated from the ground by providing suitable electrical circuitry 151 connectors and switches 155 accessible from outside the aircraft. Further, the auxiliary fuel tanks may be operated during flight by electrical circuitry 151 connected to circuit breaker panels 200, FIGS. 17, 18, mounted on an overhead console 202 in the cockpit 204. The circuit breaker panels 200 are connected through suitable elecrical harness 206 to a switch 208 on control panel 210 having fuel quantity gauges.

Figure 15:
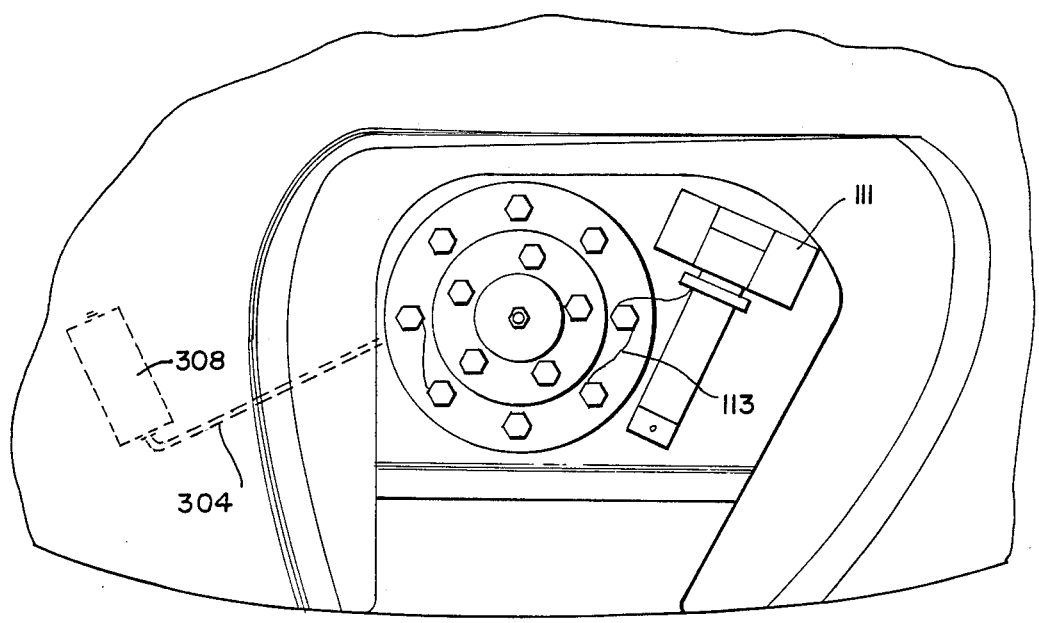
FIG. 15 is a plan view of the fuel quantity transmitter and pressure switch.
Figure 16:
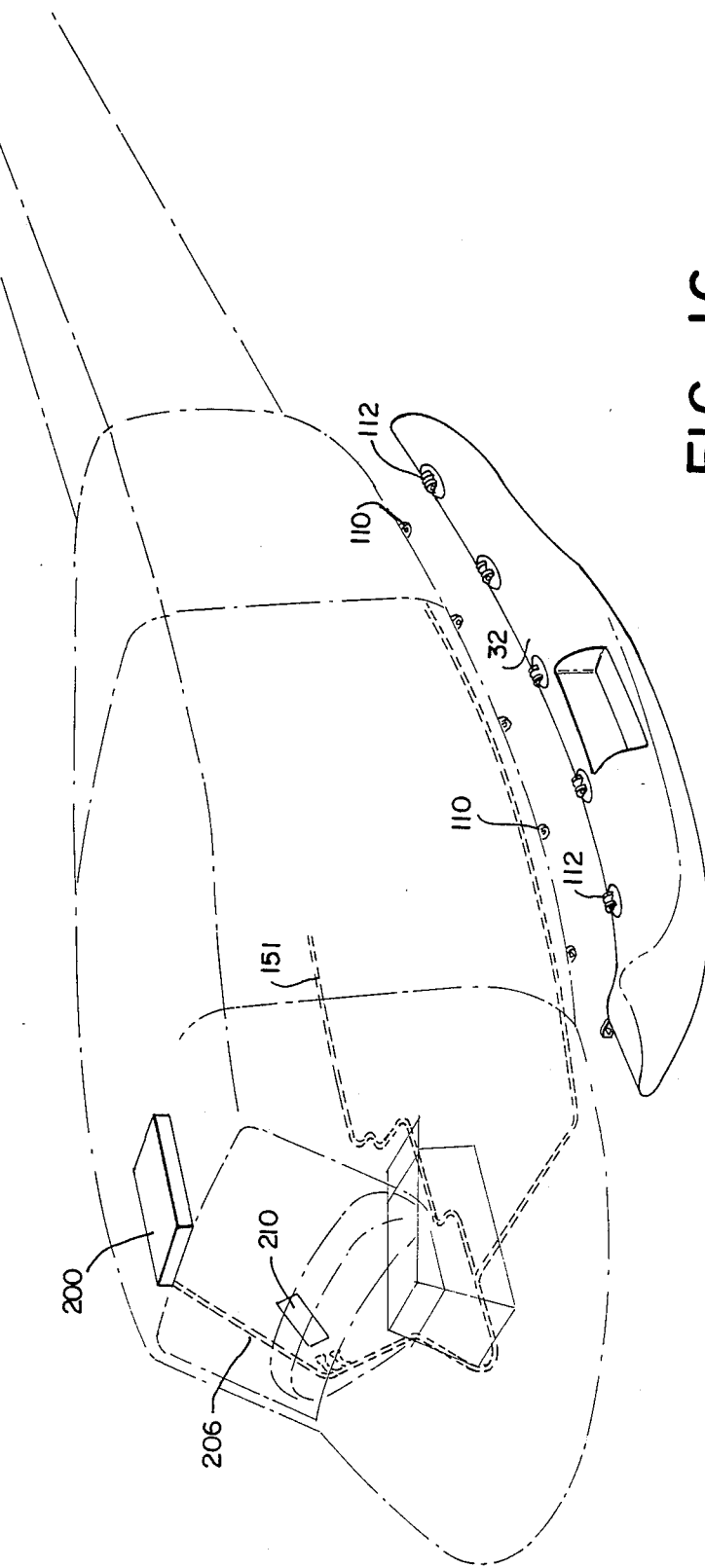
FIG. 16 is a perspective side view of the helicopter showing tank connect fittings.

Each tank 26 is provided with a float-type gauging system 300, FIG. 15, comprising a probe 302 attached at one end to a mounting plate 304 fastened to the upper wall 32 of the tanks 26. The opposite end of the probe 302 has an arm 304 pivoted to housing 306. The outer end of arm 304 carries a float 308 which moves up and down with the fuel in the tank. The arm 304 has electric and electrical means 109 connected to a transmitter 111 through wiring 305, 113. The transmitter is connected through harness 117 to a gauge located outside of the aircraft and to a gauge on the control panel in the cockpit. The transmitter 111 has an electrical socket 119 for connection to the aircraft's electrical circuitry 151. A transducer type switch 115 is attached electrically to each pump and the electrical systems, and functions to shut off each pump when the tank is empty.

The auxiliary fuel tanks also function to increase flotation of the aircraft in the event of emergency landing on water. The quick break-away of the tank couplings provides a large measure of safety in the event of a crash.

While the invention has been described with respect to a particular embodiment thereof, it will be apparent to those skilled in the art to which the invention pertains, that numerous changes may be made to the invention to enhance its function without departing from the spirit and scope thereof.

What is claimed is:

1. On a helicopter having outer curved walls with connector lugs thereon, an auxiliary fuel tank for each side of said helicopter, comprising:

each tank being of aerodynamically streamlined configuration having an outer convex wall, a top rounded wall, a bottom rounded wall and an inner concave wall for abutment against said outer curved walls of the helicopter, and a plurality of connector ears on said tanks for attachment to said connector lugs, said auxiliary fuel tanks being designed and positioned such that said bottom rounded wall extends no lower than the lowermost point of the helicopter fuselage, and the distance from the center longitudinal vertical plane of the helicopter fuselage to the outermost surface of said tanks being such that the bending moments on the rotor mast and main rotor are not adversely affected.

2. On a helicopter having outer curved walls with connector lugs thereon, auxiliary fuel tanks according to claim 1, wherein:
   said connector ears having a breakage point of 5000 PSI and said connector lugs have a breakage point of less than 5000 PSI, and above 500 PSI, whereby said tanks may break away from said helicopter in the event of a crash landing.

3. On a helicopter having outer curved walls with connector lugs thereon, auxiliary fuel tanks according to claim 1, wherein:
   said connector lugs are a first horizontal row of lugs located on said curved walls beneath the helicopter door and a second horizontal row of lugs located on said curved walls downwardly of said first row, and said connector ears are a first horizontal row of ears on said auxiliary tanks for attachment to said first horizontal row of lugs, and a second horizontal row of ears on said auxiliary tanks for attachment to said second row of lugs whereby said tanks are held against said curved walls of said helicopter.

4. On a helicopter having a main fuel tank and and having outer curved walls with connector lugs thereon, auxiliary fuel tanks according to claim 1, wherein:
   said tanks have foot steps thereon.

5. On a helicopter having a main fuel tank and having outer curved walls with connector lugs thereon, auxiliary fuel tanks according to claim 4, wherein:
   said foot steps having lighting means.

6. On a helicopter having a main fuel tank and having outer curved walls with connector lugs thereon, auxiliary fuel tanks according to claim 1, wherein:
   said tanks have gauge means therein connected by electric means to outside meter indicators whereby the fuel capacity of said tanks may be ascertained.

7. On a helicopter having a main fuel tank and having outer curved walls with connector lugs thereon, auxiliary fuel tanks according to claim 1, wherein:
   said tanks have gauge means therein connected by electrical means to meter indicators located in the cockpit whereby the fuel capacity of said tanks may be ascertained.

8. On a helicopter having outer curved walls with connector lugs thereon, an auxiliary fuel tank for each side of the helicopter, comprising:
   each tank being of aerodynamically streamlined configuration having an outer convex wall, a top rounded wall, a bottom rounded wall and an inner concave wall for abutment against said outer curved walls of said helicopter;
   a plurality of connector ears on said tanks for attachment to said connector lugs;
   said connector ears having a breakage point of 5000 PSI: and
   said connector lugs having a breakage point of less than 5000 PSI, whereby said auxiliary fuel tanks may break away from said helicopter in the event of a crash landing, said break away occurring without any action being necessary on the part of the pilot.

9. On a helicopter having a main fuel tank and outer curved walls with connector lugs thereon, an auxiliary fuel tank for each side of the helicopter, comprising:
   each tank being of aerodynamically streamlined configuration having an outer convex wall, a top rounded wall, a bottom rounded wall and an inner concave wall for abutment against said outer curved wall of said helicopter:
   a plurality of connector ears on said tanks for attachment to said lugs;
   said connector ears having a breakage point of 5000 PSI;
   said connector lugs having a breakage point of less than 5000 PSI, whereby said auxiliary fuel tanks may break away from said helicopter in the event of a crash landing;
   gravity feed lines from the helicopter's main fuel tank to said auxiliary tanks whereby said tanks are filled from said main fuel tank when said main fuel tank reaches a predetermined high level; and
   auxiliary pumps in said auxiliary fuel tanks for pumping the fuel from said tanks to said main fuel tank when said main fuel tank reaches a predetermined low level.

* * * * *